(12) United States Patent
Hirashita (10) Patent No.: US 8,408,031 B2
(45) Date of Patent: *Apr. 2, 2013

(54) IGNITION SWITCH OPERATION RESTRICTING DEVICE

(75) Inventor: Takahiro Hirashita, Aichi (JP)

(73) Assignee: Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 40 days.

This patent is subject to a terminal disclaimer.

(21) Appl. No.: 13/091,392

(22) Filed: Apr. 21, 2011

(65) Prior Publication Data

US 2011/0277519 A1 Nov. 17, 2011

(30) Foreign Application Priority Data

May 13, 2010 (JP) ................................. 2010-111382

(51) Int. Cl.
*E05B 65/12* (2006.01)

(52) U.S. Cl. ........................... 70/237; 70/252; 200/43.01

(58) Field of Classification Search ............ 70/182–186, 70/252, 247, 277, 389, 237; 477/99; 200/43.01, 200/43.05, 43.08
See application file for complete search history.

(56) References Cited

U.S. PATENT DOCUMENTS

| | | | | |
|---|---|---|---|---|
| 4,292,483 A * | 9/1981 | Roytberg | ................... | 200/43.03 |
| 4,659,883 A * | 4/1987 | Poschet | ................... | 200/43.03 |
| 4,759,203 A * | 7/1988 | Lieb et al. | ................... | 70/185 |
| 5,055,643 A * | 10/1991 | Pardini et al. | ................... | 200/318.2 |
| 5,420,385 A * | 5/1995 | Cooper | ................... | 200/43.07 |
| 5,862,903 A * | 1/1999 | Gruden et al. | ................... | 192/105 BB |
| 6,543,262 B2 * | 4/2003 | Limburg et al. | ................... | 70/186 |
| 7,302,817 B2 * | 12/2007 | Ohtaki et al. | ................... | 70/186 |
| 7,342,189 B2 * | 3/2008 | Bravard et al. | ................... | 200/43.08 |
| 8,079,239 B2 * | 12/2011 | Chung | ................... | 70/252 |
| 8,141,397 B2 * | 3/2012 | Nakamoto | ................... | 70/186 |
| 8,186,190 B2 * | 5/2012 | Nakamoto | ................... | 70/186 |
| 8,234,895 B2 * | 8/2012 | Nakamoto et al. | ................... | 70/252 |
| 2002/0029595 A1 * | 3/2002 | Limburg et al. | ................... | 70/186 |
| 2008/0041128 A1 * | 2/2008 | Ohtaki et al. | ................... | 70/237 |
| 2009/0013734 A1 * | 1/2009 | Neumayer et al. | ................... | 70/218 |
| 2010/0107709 A1 * | 5/2010 | Chung | ................... | 70/251 |

(Continued)

FOREIGN PATENT DOCUMENTS

| JP | 2002-295089 | | 9/2002 |
|---|---|---|---|
| JP | 2012017075 A | * | 1/2012 |
| JP | 2012017076 A | * | 1/2012 |

*Primary Examiner* — Lloyd Gall
*Assistant Examiner* — Myles Throop
(74) *Attorney, Agent, or Firm* — Roberts Mlotkowski Safran & Cole P.C.

(57) ABSTRACT

An operation restricting device for an ignition switch includes a body including a turning restriction portion at a first position and a second portion, a rotor rotatably disposed in the body, a locking pin held movably in a turning plane of the rotor by the rotor, for restricting a first turn of the rotor from the second position to the first position, and a second turn of the rotor from the first position to the second position, the first turn and the second turn being opposite to each other, and a plate disposed movably or immovably in a movement plane of the locking pin, for permitting the first turn and the second turn of the rotor by switching an actuator. The turning restriction portion at the second position includes a turning lever to turn in the turning plane of the rotor.

12 Claims, 7 Drawing Sheets

U.S. PATENT DOCUMENTS

| | | | |
|---|---|---|---|
| 2010/0132417 A1* | 6/2010 | Chung | 70/248 |
| 2010/0192645 A1* | 8/2010 | Nakamoto | 70/183 |
| 2010/0192646 A1* | 8/2010 | Nakamoto | 70/237 |
| 2011/0100075 A1* | 5/2011 | Cho et al. | 70/183 |
| 2011/0278140 A1* | 11/2011 | Kakizaki | 200/43.01 |
| 2012/0260701 A1* | 10/2012 | Okada et al. | 70/183 |

* cited by examiner

| SHIFT-LEVER POSITION | P POSITION | | | | NON-P POSITION | | | |
|---|---|---|---|---|---|---|---|---|
| IG ROTOR POSITION | LOCK | ACC | ON | START | LOCK | ACC | ON | START |
| ENERGIZING STATE | ○ (WHEN AUTHENTICATED) | × | × | × | / | ○ | ○ | × |

○ ··· ENERGIZED
× ··· DE-ENERGIZED

IGNITION SWITCH OPERATION RESTRICTING DEVICE

The present application is based on Japanese patent application No. 2010-111382 filed on May 13, 2010, the entire contents of which are incorporated herein by reference.

BACKGROUND OF THE INVENTION

1. Field of the Invention

This invention relates to an ignition switch operation restricting device and, in particular, to an ignition switch operation restricting device that has a function to restrict a rotation operation of an ignition switch in a vehicle etc.

2. Description of the Related Art

In recent years, an electronic key system is suggested that is adapted to authenticate a vehicle key by an electric signal (i.e., ID code or Identification code) from the vehicle key.

In the electronic key system, when the ID code included in the transmission signal from the vehicle key corresponds with the ID code previously registered in an in-vehicle transceiver device, the operation knob (i.e., switching member) of the ignition switch becomes operable. Thereby, the driver can start up the engine etc. of the vehicle by turning the switching member.

JP-A-2002-295089 discloses an ignition switch operation restricting device that uses such an electronic key system, wherein the device is provided with a first locking mechanism (i.e., knob locking mechanism) for blocking the switching operation from "LOCK (locking)" position to "ACC (accessory)" position of the switching member when the vehicle key is not authenticated, and a second locking mechanism (i.e., interlocking mechanism) for blocking the switching operation from the "ACC (accessory)" position to the "LOCK (locking)" position of the switching member when the shift lever of the vehicle is located at a position (i.e., neutral position (hereinafter N position) or drive position (hereinafter D position)) other than the parking position (hereinafter P position).

The first locking mechanism functions to block the switching operation from the "LOCK" position to the "ACC" position of the switching member when a first solenoid is not energized, and to permit the switching operation from the "LOCK" position to the "ACC" position of the switching member when the first solenoid is energized.

The first solenoid is formed of an attraction type solenoid including a first plunger to move in the attraction direction when energized, and a first spring to provide the first plunger with a spring force in an opposite direction to the attraction direction.

The second locking mechanism functions to permit the switching operation from the "ACC" position to the "LOCK" position of the switching member when a second solenoid is not energized, and to block the switching operation from the "ACC" position to the "LOCK" position of the switching member when the second solenoid is energized.

The second solenoid is formed of an attraction type solenoid including a second plunger to move in the attraction direction when energized, and a second spring to provide the second plunger with a spring force in an opposite direction to the attraction direction.

When the first solenoid is energized to activate the first locking mechanism, the first locking mechanism allows the switching operation of the switching member from the "LOCK" position to the "ACC" position. When the first solenoid is not energized to reversely activate the first locking mechanism, the first locking mechanism blocks the switching operation of the switching member from the "LOCK" position to the "ACC" position.

On the other hand, when the second solenoid is energized to activate the second locking mechanism, the second locking mechanism blocks the switching operation of the switching member from the "ACC" position to the "LOCK" position. When the second solenoid is not energized to reversely activate the second locking mechanism, the second locking mechanism allows the switching operation of the switching member from the "ACC" position to the "LOCK" position.

However, since the ignition switch operation restricting device of JP-A-2002-295089 needs the two solenoids as actuators for restricting the operations to the "LOCK" position and from the "LOCK" position, there is a problem that the entire device increases in size and the power consumption increases.

SUMMARY OF THE INVENTION

Accordingly, it is an object of the invention to provide an ignition switch operation restricting device that the entire device can be downsized and the power consumption can be reduced.

(1) According to one embodiment of the invention, an operation restricting device for an ignition switch to switch electric power supplied to a vehicle by turning an operation member comprises:

a body comprising a turning restriction portion at a first position and a second portion arranged in a circumferential direction of the body;

a rotor rotatably disposed in the body and rotated by turning the operation member in a turning region including the first position and the second position;

a locking pin held movably in a turning plane of the rotor by the rotor, for restricting a first turn of the rotor from the second position to the first position, and a second turn of the rotor from the first position to the second position, the first turn and the second turn being opposite to each other; and a plate disposed movably or immovably in a movement plane of the locking pin, for permitting the first turn and the second turn of the rotor by switching an actuator, wherein the turning restriction portion at the second position comprises a turning lever to turn in the turning plane of the rotor.

In the above embodiment (1) of the invention, the following modifications and changes can be made.

(i) The turning lever comprises a locking lever for restricting from turning the locking pin in the second turn of the rotor when the actuator is energized.

(ii) The ignition switch operation restricting device further comprises:

a first spring for applying to the locking pin a repulsive force to push the body and the plate; and a second spring for applying to the plate a repulsive force smaller than that of the first spring in a direction opposite to the repulsive force of the first spring.

(iii) The turning restriction portion at the first position comprises a restriction hole formed in the body and shaped to accommodate a tip potion of the locking pin.

(iv) The restriction hole stops the locking pin in the first turn of the rotor when the actuator is not energized.

(v) The plate comprises an inclined surface for releasing the stopping of the locking pin in the first turn of the rotor when the actuator is energized.

(vi) The repulsive force of the first spring is applied such that it allows the locking pin to move in the turning plane of the rotor to release the stopping of the locking pin in the second turn when the actuator is not energized.

(vii) The locking lever comprises an inclined surface at a side face contacting the locking pin in the first turn, and the inclined surface allows the first turn of the rotor when the actuator is energized.

(viii) The plate is kept to protrude from the body to the rotor such that the inclined surface allows the stopping of the locking pin to be released, in the first turn of the rotor when the actuator is energized.

(ix) The plate is kept to protrude from the body to the rotor such that the locking lever allows the stopping of the locking pin, in the second turn of the rotor when the actuator is energized.

Effects of the Invention

According to one embodiment of the invention, an ignition switch operation restricting device may be provided that the entire device can be downsized and the power consumption can be reduced.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Embodiment

Construction of Electronic Key System

Figure 1:
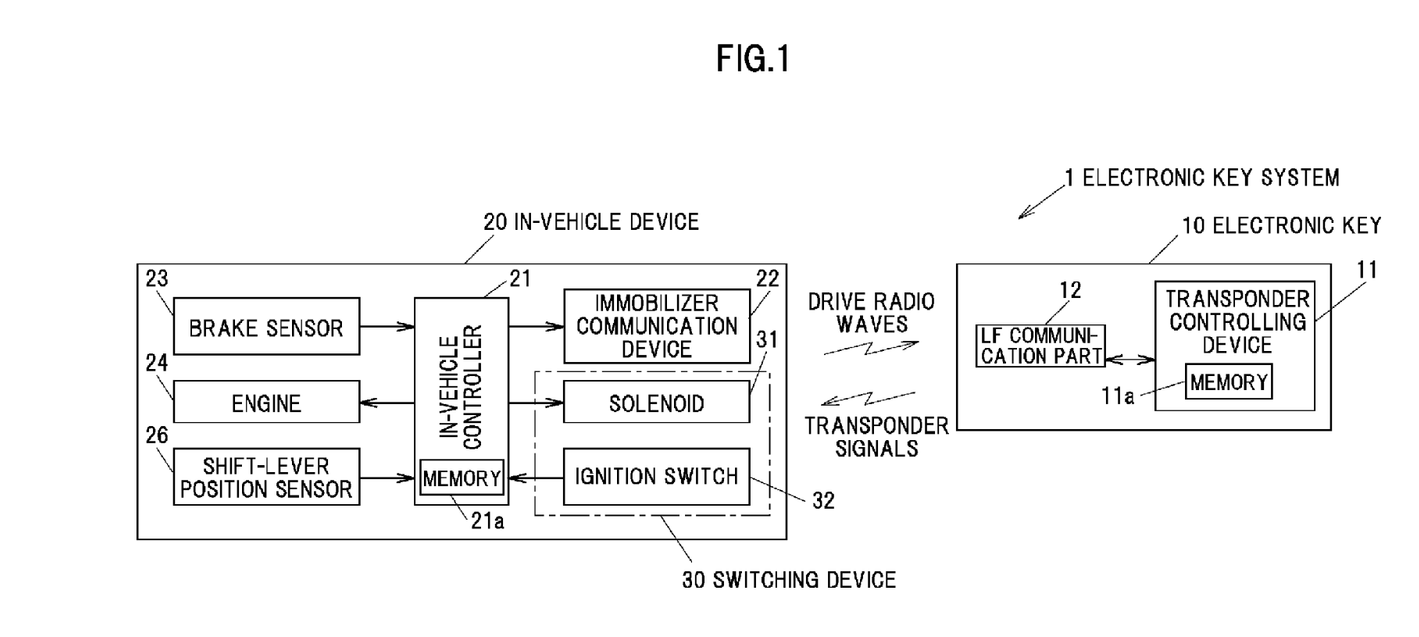
FIG. 1 is a block diagram showing an electronic key system equipped with an ignition switch operation restricting device in a preferred embodiment according to the invention.

FIG. 1 shows the electronic key system. As shown in FIG. 1, the electronic key system 1 comprises an electronic key 10 as an operation member to be carried with the user, and an in-vehicle device 20 equipped in the vehicle. A two-way communication can be established between the electronic key 10 and the in-vehicle device 20.

Construction of the Electronic Key 10

The electronic key 10 comprises an LF (low frequency) communication part 12 for transmitting and receiving radio waves with the in-vehicle device 20, and a transponder controlling device 11.

The transponder controlling device 11 has a memory 11a. The memory 11a includes a transponder code registered therein. When the user causes the electronic key 10 to be close to an immobilizer communication device 22, the LF communication part 12 receives a drive radio wave from the immobilizer communication device 22, and the transponder controlling device 11 is activated thereby. Then, the transponder controlling device 11 sends a transponder signal with the transponder code included therein from the LF communication part 12.

Construction of the In-Vehicle Device 20

The in-vehicle device 20 has an in-vehicle controller 21 for conducting an integrated control thereof. The in-vehicle device 20 operates such that, when the immobilizer communication device 22 thereof receives the transponder signal from the LF communication part 12, it carries out the identification (or authentication) between the transponder code included in the transponder signal and the transponder code stored in the memory 21a of the in-vehicle controller 21. When authenticated (i.e., when the identity is established), the in-vehicle controller 21 permits or inhibits the switching (or turning) of an ignition switch 32 by energizing a solenoid 31.

The in-vehicle controller 21 is electrically connected to a brake sensor 23. The in-vehicle controller 21 detects the existence of the brake operation through the brake sensor 23. Only when the brake operation is detected, the in-vehicle controller 21 transmits the drive radio wave as an LF-band radio signal through the immobilizer communication device 22. The drive radio wave is transmitted at a short distance (e.g., within tens of centimeters) of the immobilizer communication device 22.

Also, the in-vehicle controller 21 is electrically connected to a shift-lever position sensor 26. The shift-lever position sensor 26 detects at which of a drive position (or D position), a parking position (or P position) etc. a shift lever (or gear shifting lever) is located. The in-vehicle controller 21 can detect the position of the shift lever through the shift-lever position sensor 26.

The in-vehicle controller 21 is connected to a switching device 30 for requesting the starting, stopping etc. of an engine 24 via the operation of the user.

Figure 2:
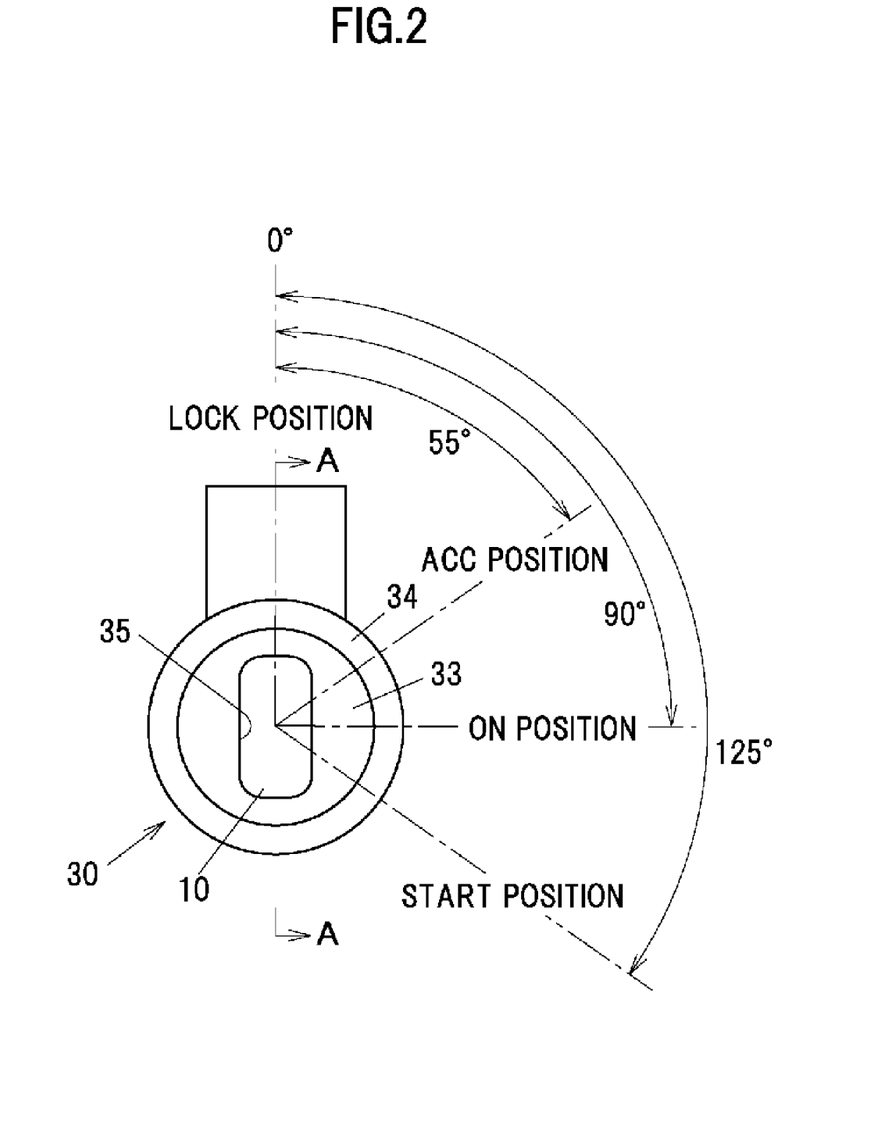
FIG. 2 is a front view showing a switching device equipped with the ignition switch operation restricting device of the embodiment.
Figure 3:
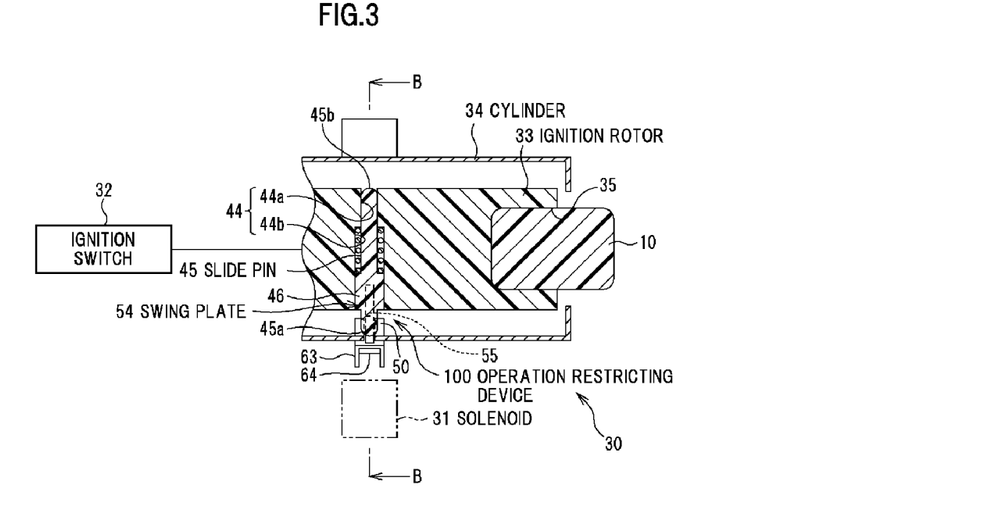
FIG. 3 is a cross sectional view cut along the line A-A in FIG. 2.
Figure 4:
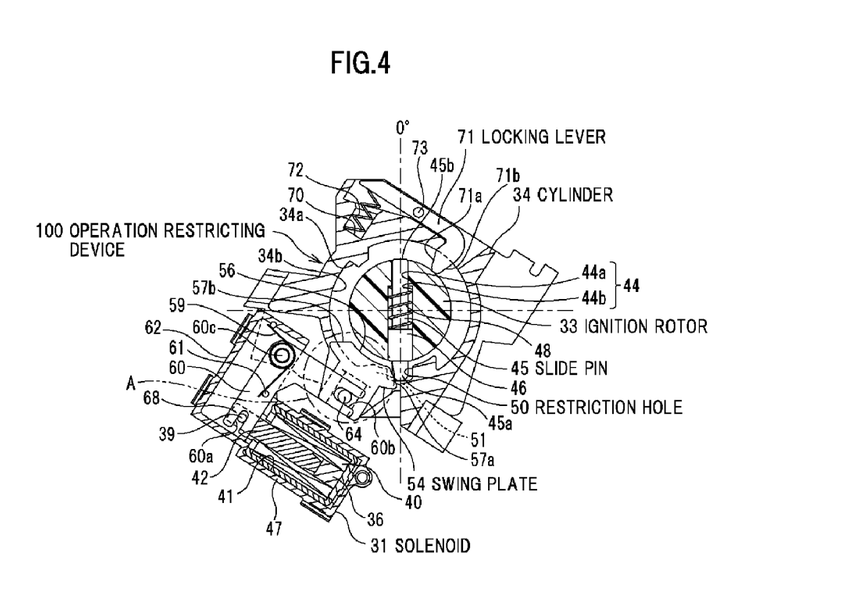
FIG. 4 is a cross sectional view cut along the line B-B in FIG. 3.
Figure 5:
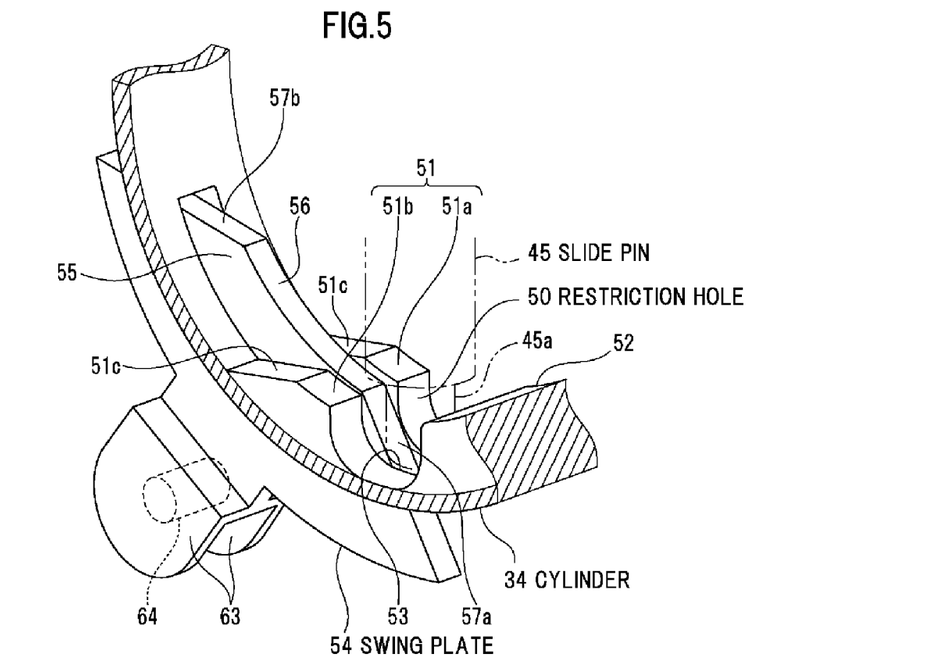
FIG. 5 is a perspective view showing a part A (indicated by two-dot chain line) in FIG. 4.
Figure 6:
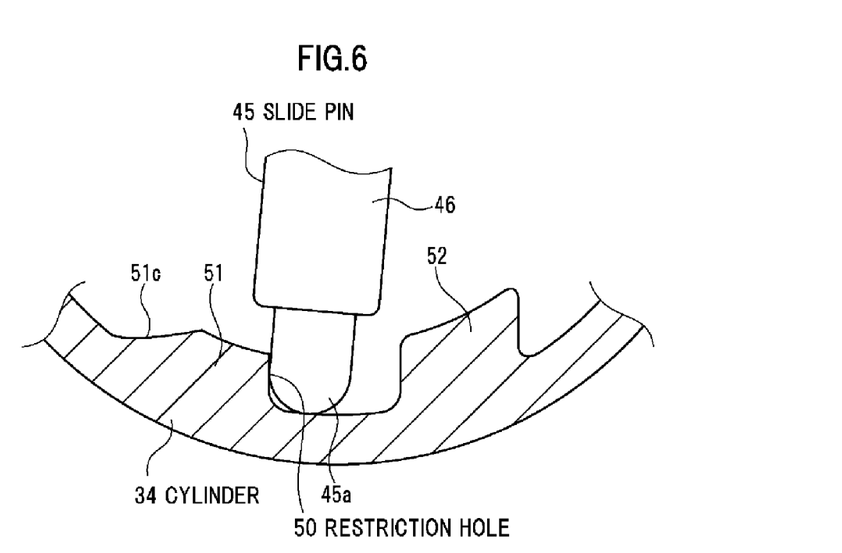
FIG. 6 is a cross sectional view showing the state that an ignition rotor is restrained from turning from "LOCK" position in the ignition switch operation restricting device of the embodiment.
Figure 7:
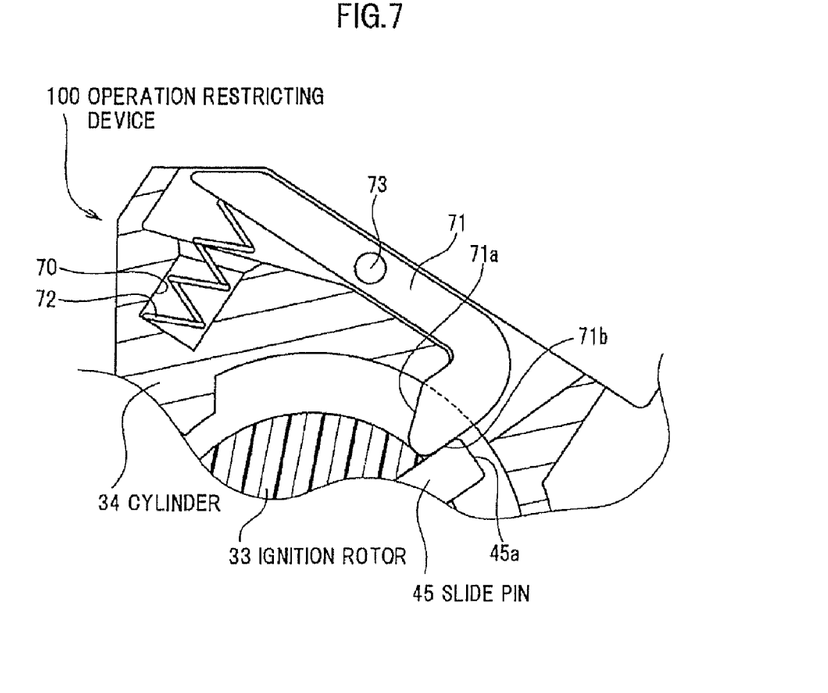
FIG. 7 is a cross sectional view showing the state that the ignition rotor is restrained from turning toward the "LOCK" position in the ignition switch operation restricting device of the embodiment.

The construction of the switching device 30 will be described below. FIG. 2 shows the switching device 30. FIGS. 3 and 4 show an ignition switch operation restricting device. FIG. 5 shows a swing plate and a cylinder. FIG. 6 shows the state that the ignition rotor is restricted from turning from the "LOCK" position. FIG. 7 shows the state that the ignition rotor is restricted from turning toward the "LOCK" position.

The switching device 30 as shown in FIG. 2 comprises the solenoid 31 and the ignition switch 32 as shown in FIG. 3. When the in-vehicle controller 21 (shown in FIG. 1) receives through the switching device 30 the request for starting or stopping the engine 24 (shown in FIG. 1), it correspondingly causes the engine 24 to start or stop.

As shown in FIG. 4, the solenoid 31 comprises a retention type solenoid having a case 47 of resin, and a plunger 42 accommodated and protruding from the case 47.

The plunger 42 is formed of a bar-shaped magnetic member. The case 47 includes an insert hole 41 for inserting the plunger 42 thereinto. A coil 40 is attached to the inside wall of the insert hole 41. A fixed core 36 is disposed at the bottom of the insert hole 41 where it can be contacted with the end face of the plunger 42.

When the coil 40 is not energized (i.e., in its de-energized state), the plunger 42 can be retained by the spring force (or repulsive force) of a twisted coil spring 59 (described later) while contacting the fixed core 36, and can move freely relative to the case 47. When the coil 40 is energized (i.e., in its energized state), a magnetic force occurs such that the plunger 42 is attracted to the fixed core 36 by a magnetic field formed by the coil 40.

Thus, the solenoid 31 is constructed such that, by energizing the coil 40, the plunger 42 is attracted to the fixed core 36 from the position where it contacts the fixed core 36. Therefore, the solenoid 31 can be reduced in energization time as compared to the attraction type solenoid, so that the power consumption thereof can be reduced. In addition, since the energization time for the coil 40 decreases, heat generation caused by the energization can be reduced whereby a heat-dissipating mechanism etc. can be omitted.

The plunger 42 has a cylindrical shaft part 39 protruding from both sides on the periphery of a tip portion thereof. The plunger 42 is pushed by the twisted coil spring 59 through the shaft part 39 in the insertion direction (i.e., rightward in FIG. 4) of the case 47. Thereby, even when the solenoid 31 is not energized, the plunger 42 is kept contacted to the fixed core 36.

As shown in FIG. 3, the ignition switch 32 operates such that, when the user inserts the electronic key 10 into an key hole 35 and then turns an ignition rotor 33 (described later), the contact connection state can be switched into "LOCK", "ACC", "ON" or "START" in accordance with the turning position (e.g., "LOCK" position, "ACC" position, "ON" position and "START" position as shown in FIG. 2) of the ignition rotor 33.

According to the connection state of the ignition switch 32, the state of the various in-vehicle equipments and the engine 24 can be switched. For example, when the contact connection state of the ignition switch 32 is in "LOCK", no electric power is fed to any of the in-vehicle equipments. In the "ACC" state, electric power is fed to a part of the in-vehicle equipments such as an audio device. In the "ON" state, electric power is fed to all of the in-vehicle equipments. In the "START" state, the engine 24 is activated. Then, when switched from the "ON" state into the "ACC" state, the engine 24 stops.

The switching device 30 include, other than the solenoid 31 and the ignition switch 32 mentioned above, a cylinder 34 as a body and the cylindrical ignition rotor 33 disposed turnable in the cylinder 34. The switching device 30 further includes an operation restricting device 100 for the ignition switch 32.

The operation restricting device 100 for the ignition switch 32 includes the ignition rotor 33, the cylinder 34, a slide pin 45, a swing plate 54 and a locking lever 71.

The ignition rotor 33 is provided with the key hole 35 which opens at an end face exposed to the outside of the cylinder 34 and into which the electronic key 10 can be inserted. The user can turn the ignition rotor 33 by turning the electronic key 10 inserted into the key hole 35.

The ignition switch 32 is connected opposite the key hole 35 of the ignition rotor 33. As described above, the contact connection state can be switched into "LOCK", "ACC", "ON" or "START" in accordance with the turning position of the ignition rotor 33. The position of the ignition rotor 33 to provide the "LOCK" state is defined as the "LOCK" position. In like manner, the positions of the ignition rotor 33 to provide the "ACC" state, the "ON" state and the "START" state are defined as the "LOCK" position, the "ACC" position, the "ON" position and the "START" position, respectively.

Thus, by using the electronic key 10, the ignition rotor 33 can be turned to regions (i.e., the "LOCK" position, the "ACC" position, the "ON" position and the "START" position) including a restriction hole 50 as a turning restricting portion disposed at a first position in the cylinder 34 and the locking lever 71 as a turning restricting portion disposed at a second position in the cylinder 34 so as to switch the power supply state of the vehicle.

On the periphery of the ignition rotor 33, a ring-shaped return spring (not shown) is disposed. One end of the return spring is fixed on the inner wall of the cylinder 34, and the other end thereof is fixed on the periphery of the ignition rotor 33. Thereby, when the ignition rotor 33 is turned toward the "START" position and the turning force is then released, the ignition rotor 33 returns to the "ON" position by the repulsive force of the return spring.

When the ignition rotor 33 is at the "LOCK" position, the steering column lock is activated to restrict the turning of the steering wheel. When the ignition rotor 33 is turned from the "LOCK" position to the "ACC" position, the steering column lock is released to allow the turning of the steering wheel.

The ignition rotor 33 is provided with a substantially cylindrical pin-inserting hole 44 which opens at the periphery of the ignition rotor 33 and penetrates in the radial direction.

The pin-inserting hole 44 has a small-diameter bore part 44a located at an upper side in FIG. 4 and a large-diameter bore part 44b located at a lower side in FIG. 4. The bore of the large-diameter bore part 44b is set to be greater than that of the small-diameter bore part 44a. The slide pin 45 as a locking pin is inserted in the pin-inserting hole 44.

The cylinder 34 is provided with the restriction hole 50, as the turning restriction portion, which opens at the inner periphery of the cylinder 34 and into which a first tip portion 45a (described later) of the slide pin 45 is inserted. As shown in FIG. 5, the restriction hole 50 is formed by a first restriction part 51 and a second restriction part 52.

The first restriction part 51 has substantially trapezoidal restriction members 51a, 51b disposed opposite in the axis direction of the ignition rotor 33. The gap between the restriction members 51a and 51b is set to be less than the outer diameter of the first tip portion 45a. The top surface of the restriction members 51a and 51b is formed with a curve along the inner periphery of the cylinder 34. The side surface of the restriction members 51a and 51b for forming the restriction hole 50 is formed with a curve according to the spherical surface of the first tip portion 45a.

On the opposite side of the restriction hole 50, the restriction members 51a and 51b has inclined surfaces 51c gradual to slide the first tip portion 45a (shown in FIG. 4) of the slide pin 45 (shown in FIG. 4). The inclined surface 51c is formed such that its level increases toward the restriction hole 50 while having the inner periphery of the cylinder 34 as a reference surface.

The second restriction part 52 is shaped like a substantially rectangular solid along the inner periphery of the cylinder 34. The side surface of the second restriction part 52 for forming the restriction hole 50 is formed with a curve according to the spherical surface of the first tip portion 45a.

The turning of the ignition rotor 33 is restricted or prohibited by the first tip portion 45a of the slide pin 45 contacting the side surface of the first and second restriction parts 51 and 52 forming the restriction hole 50.

The locking lever 71 as a turning restriction portion is disposed on the periphery of the cylinder 34 and arranged with the restriction hole 50 at a predetermined interval from the restriction hole 50 in the circumferential direction of the cylinder 34.

The locking lever 71 has a turning lever to turn in the turning plane of the ignition rotor 33, is pushed against the outer periphery of the ignition rotor 33 by the repulsive force of the spring 72, and is formed to turn around a supporting pin 73. The spring 72 is disposed between one end of the locking lever 71 and the bottom of an accommodation hole 70.

The tip part (at the other end) of the locking lever 71 is provided with an inclined surface 71a on the side of the "LOCK" position of the ignition rotor 33.

When the ignition rotor 33 turns from the "LOCK" position to the "ACC" position, the first tip portion 45a reaches a contact surface 56 (shown in FIG. 5) via an inclined surface 57a (shown in FIG. 5) of the swing plate 54. Along with this, the slide pin 45 is moved to the ignition rotor 33 opposite the swing plate 54 against the repulsive force of a biasing spring 48.

Here, a second tip portion 45b protrudes from the outer periphery of the ignition rotor 33 according to the height of the first restriction part 51. The protruded second tip portion 45b contacts the inclined surface 71a while the ignition rotor 33 reaches the "ACC" position. According as the ignition rotor 33 is turned to the "ACC" position in the contact state, the locking lever 71 turns counterclockwise against the repulsive force of the spring 72 by the pushing force of the second tip portion 45b via the inclined surface 71a.

Thus, the second tip portion 45b crosses over the locking lever 71 from the "LOCK" position, so that the ignition rotor 33 can be turned to the "ACC" position. When the second tip portion 45b crosses over the locking lever 71, the locking lever 71 turns clockwise by the repulsive force of the spring 72 and contacts the periphery of the ignition rotor 33 such that it returns to the initial position.

The tip part (at the other end) of the locking lever 71 is provided with a restriction surface 71b substantially perpendicular to the periphery of the ignition rotor 33 on the side of the "ACC" position of the ignition rotor 33.

When the ignition rotor 33 is turned from the "ACC" position to the "LOCK" position with the second tip portion 45b protruding from the periphery of the ignition rotor 33, the second tip portion 45b contacts the restriction surface 71b from the perpendicular direction thereof. Here, although a force occurs that pushes the locking lever 71 in the turning direction (counterclockwise) of the ignition rotor 33, no force occurs that have the locking lever 71 turn. Thus, the ignition rotor 33 is restricted from turning from the "ACC" position to the "LOCK" position (i.e., the second turn from the first position to the second position).

The cylinder 34 is, on the inner periphery thereof, provided with a pin-receiving surface 34b that leads from the inclined surface 51c and forms a restraint surface with the swing plate 54 (i.e., the contact surface 56 and the inclined surfaces 57a, 57b).

The cylinder 34 is, on the inner periphery thereof and between the restriction members 51a and 51b, provided with a plate-inserting hole 53 which extends in the turning direction of the ignition rotor 33 and through which a slide contact portion 55 of the swing plate 54 is inserted from outside of the cylinder 34.

The slide pin 45 has an outer diameter about the same as the inner diameter of the small-diameter bore part 44a, is shaped like a cylinder, and is, at one side in the axis direction, provided with a slide portion 46 which has an outer diameter about the same as the inner diameter of the large-diameter bore part 44b. The slide pin 45 is movably in the turning plane of the ignition rotor 33 held by the ignition rotor 33 and the slide portion 46 slides in the large-diameter bore part 44b, so that the slide pin 45 can move in the pin-inserting hole 44.

The slide pin 45 contacts the side surface of the restriction hole 50, whereby the ignition rotor 33 is restricted from turning (clockwise in FIG. 4) from the "LOCK" position to the "ACC" position (i.e., the first turn from the second position to the first position).

The length of the slide pin 45 in the axis direction is greater than the outer diameter of the ignition rotor 33. Here, the slide pin 45 is provided with the first tip portion 45a to be pushed against the inner periphery of the cylinder 34 by the biasing spring 48, and the second tip portion 45b opposite the first tip portion 45a. The first tip portion 45a is formed with a spherical surface and the second tip portion 45b is formed with a curve along the circumferential surface of the ignition rotor 33.

The biasing spring 48 comprises a compression coil spring, is disposed on the periphery of the slide pin 45, and is accommodated in the pin-inserting hole 44.

The biasing spring 48 is interposed between the top end of the slide portion 46 and the inside top end of the large-diameter bore part 44b. Thereby, the repulsive force of the biasing spring 48 is always applied to the slide pin 45 toward the inner periphery of the cylinder 34.

The swing plate 54 is disposed movable or immovable in the movement plane of the slide pin 45, and connected through a link 60 to the solenoid 31. The swing plate 54 is allowed or not allowed to move toward the cylinder 34 by the linkage mechanism composed of the link 60 and the solenoid 31.

The swing plate 54 is, on the lower side, provided with a pair of connection parts 63 (shown in FIG. 5) opposed in the thickness direction. Between the pair of connection parts 63, a cylindrical shaft part 64 is provided extending in the opposite direction.

The slide contact portion 55 is provided, on the top surface side (i.e., the surface on the cylinder 34 side in FIG. 5), with the contact surface 56 with a curve along the inner periphery of the cylinder 34, and the inclined surfaces 57a, 57b on both sides of the contact surface 56. The contact surface 56 and the inclined surfaces 57a, 57b function as a pin-receiving surface for forming a restraint mechanism with the slide pin 45 when the first turn is allowed.

The inclined surface 57a is disposed at the restraint hole 50 side of the slide contact portion 55, and the inclined surface 57a is disposed at the opposite side. Thus, when the slide contact portion 55 is inserted into the plate-inserting hole 53, the slide pin 45 can slide from the inclined surface 57a through the contact surface 56 to the inclined surface 57b, or in the reverse order.

The slide contact portion 55 is set to have, at the end opposite to the end on the insertion side, a width greater than the plate-inserting hole 53. Thus, when the slide contact portion 55 is inserted into the plate-inserting hole 53 from outside, an engagement state is made that the inclined surfaces 57a, 57b contact the both arch ends of the plate-inserting hole 53. Thereby, the insertion position of the slide contact portion 55 can be determined. The inclination angle of the inclined surfaces 57a, 57b and the length of the plate-inserting hole 53 etc. are set such that, in this state, the height of the protrusion from the inner periphery of the cylinder 34 is about the same as the height of the first restriction part 51.

The link 60 has a shaft 60c at the intermediate part, is rotatably around the shaft 60c supported by the cylinder 34, and is formed of a nearly L-shaped plate member.

A U-shaped link groove 60b is provided at the right end of the link 60 for receiving the shaft part 64 of the swing plate 54 therein. A pair of connection parts 68 is provided at the lower end of the link 60 for sandwiching the tip portion of the plunger 42 from the opposed sides. The pair of connection parts 68 is provided with a U-shaped link groove 60a for receiving the shaft part 39 therein. By inserting the shaft part 64 into the link groove 60b of the link 60 and by inserting the shaft part 39 into the link groove 60a such that the pair of connection parts 68 is opposed via the plunger 42, the connection of the plunger 42, the link 60 and the swing plate 54 are made.

The link 60 is connected to them such that it can turn around the shaft part 39 relative to the plunger 42 and around the shaft part 64 relative to the swing plate 54. The twisted coil spring 59 (i.e., the second spring) is attached to the shaft 60c of the link 60.

The twisted coil spring 59 is, at one end thereof, fixed to a wall surface 62 of the case of the switching device 30 (shown in FIG. 3) and, at the other end thereof, fixed to a protrusion 61 of the link 60. The twisted coil spring 59 serves to apply to the link 60 a repulsive force less than the repulsive force of the biasing spring 48 in the counterclockwise direction, i.e., in the direction of allowing the swing plate 54 to receive the pushing force of the slide pin 45 (or in the opposite direction to repulsive force of the biasing spring 48). Thereby, when the solenoid 31 is not energized, the slide pin 45 is allowed to move toward the swing plate 54. When the solenoid 31 is energized, the swing plate 54 can be kept inserted into the plate-inserting hole 53.

The linkage mechanism with the link 60 is constructed such that, when an external force (i.e., repulsive force of the biasing spring 48) outward from the cylinder 34 is applied through the slide pin 45 to the swing plate 54, the link groove 60b of the link 60 is pushed down via the shaft part 64. Thereby, the link 60 turns clockwise around the shaft 60c against the repulsive force of the twisted coil spring 59. An external force is applied to the plunger 42 via the shaft part 39 engaging with the link groove 60a in the direction (i.e., leftward in FIG. 4) that the plunger 42 protrudes from the case 47.

Here, when the ignition rotor 33 is located at the "LOCK" position and the solenoid 31 is not energized, the plunger 42 can move in the axis direction. Thus, when the ignition rotor 33 is located at the "LOCK" position, the swing plate 54 is moved outside of the cylinder 34 by the pushing force of the slide pin 45. Accordingly, as shown in FIG. 6, the first tip portion 45a of the slide pin 45 is held in the restriction hole 50 so as to restrict the ignition rotor 33 from turning from the "LOCK" position to "ACC" position.

When the solenoid 31 is energized, the plunger 42 is fixed to the case 47. In this situation, when the ignition rotor 33 is located at the "ACC" position, the plunger 42 cannot be moved to the left. Therefore, even when the swing plate 54 receives the pushing force of the slide pin 45, it cannot be moved outside of the cylinder 34 and, as shown in FIG. 7, the second tip portion 45b is stopped by the restriction surface 71b of the locking lever 71 such that the ignition rotor 33 is restricted from turning from the "ACC" position to the "LOCK" position.

Operation of the Ignition Switch Operation Restricting Device

Figure 8:
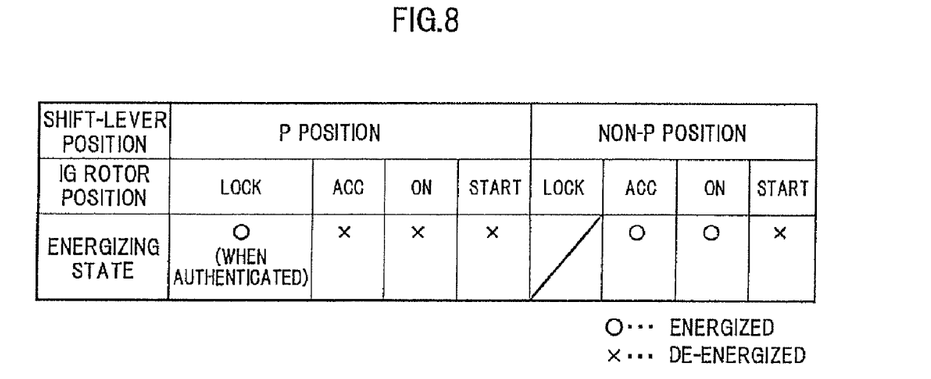
FIG. 8 is a table for explaining the energizing state of a solenoid corresponding to the positions of a shift lever and the ignition rotor in the ignition switch operation restricting device of the embodiment.
Figure 9A:
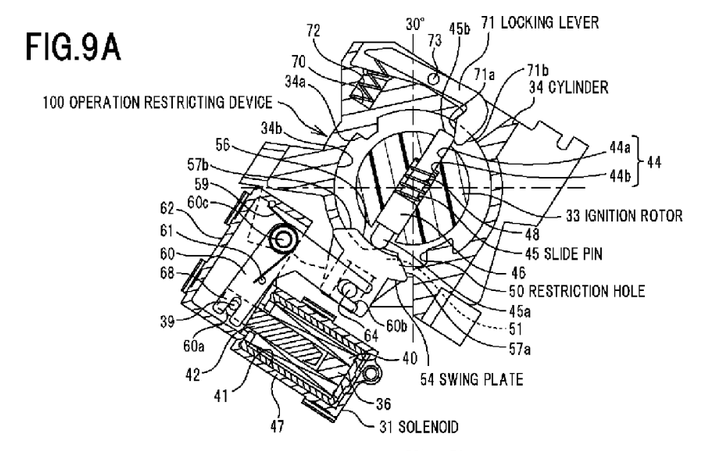
FIGS. 9A to 9C are cross sectional views showing the turning operation of the ignition rotor from the "LOCK" position to "ACC" position in the ignition switch operation restricting device of the embodiment.
Figure 9B:
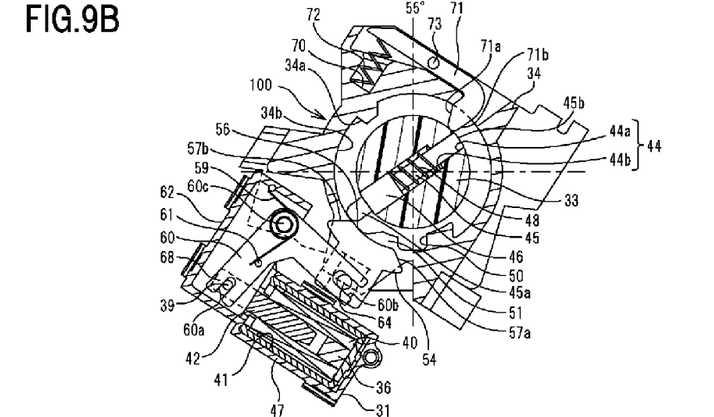

The operation of the operation restricting device 100 for the ignition switch 32 will be described below referring to FIGS. 8 to 10. FIG. 8 is a table for explaining the energizing state of the solenoid corresponding to the positions of the shift lever and the ignition rotor. FIGS. 9A to 9C show the turning operation of the ignition rotor from the "LOCK" position to the "ACC" position. FIGS. 10A to 10C show the turning operation of the ignition rotor from the "ACC" position to the "LOCK" position. The in-vehicle controller 21 (shown in FIG. 1) is adapted to switch the energizing state of the solenoid 31 according to the table in FIG. 8. Meanwhile, the in-vehicle controller 21 can detect the turning position of the ignition rotor 33 through the connection state of the contacts of the ignition switch 32.

At first, the user inserts the electronic key 10 into the key hole 35 for activating the engine 24. Here, since the vehicle is parked, the shift lever is located at the P position and the ignition rotor 33 is located at the "LOCK" position.

When the electronic key 10 is not inserted into the key hole 35 or the electronic key inserted into the key hole 35 is not an authorized key, the solenoid 31 is not energized since the transponder code is not authenticated by the in-vehicle controller 21.

When the solenoid 31 is not energized, the plunger 42 can move relative to the case 47. In this situation, when it is tried to turn the ignition rotor 33 from the "LOCK" position to the "ACC" position, the first tip portion 45a pushes down (i.e., outside of the cylinder 34) the swing plate 54 via the inclined surface 57a. Thereby, the first tip portion 45a contacts the side surface of the first restriction part 51 forming the restriction hole 50 so as to restrict the ignition rotor 33 from turning. In addition, the second restriction part 52 always restricts the ignition rotor 33 from turning from the "LOCK" position to the opposite side to the "ACC" position (i.e., turning counterclockwise in FIG. 2).

Thus, the ignition rotor 33 can be restricted from turning when the electronic key 10 is not inserted into the key hole 35 or the electronic key inserted into the key hole 35 is not the authorized key.

When the electronic key 10 is the authorized key, the in-vehicle controller 21 judges that the transponder code received is authenticated and the solenoid 31 is then energized.

When the solenoid 31 is energized, the plunger 42 is fixed to the case 47 as shown in FIG. 4 such that the swing plate 54 is fixed or immobilized relative to the cylinder 34.

In this situation, when the ignition rotor 33 is turned from the "LOCK" position to the "ACC" position, the first tip portion 45a moves along the inclined surface 57a of the slide contact portion 55 against the repulsive force of the biasing spring 48. Then, as shown in FIG. 9A, the first tip portion 45a reaches the contact surface 56. Here, the second tip portion 45b protrudes from the periphery of the ignition rotor 33 to contact the inclined surface 71a of the locking lever 71.

When the ignition rotor 33 is further turned, the first tip portion 45a moves along the contact surface 56. Here, the second tip portion 45b has the locking lever 71 turn counterclockwise via the inclined surface 71a against the repulsive force of the spring 72. Then, as shown in FIG. 9B, the second tip portion 45b crosses over the locking lever 71 such that the ignition rotor 33 is located at the "ACC" position.

The ignition rotor 33 at the "ACC" position is enabled to turn to the "ON" position and "START" position. As shown in FIG. 8 (Table), when the ignition rotor 33 is turned from the "LOCK" position to the "ACC" position, the energization of the solenoid 31 is stopped since the shift lever is located at the P position.

Figure 9C:
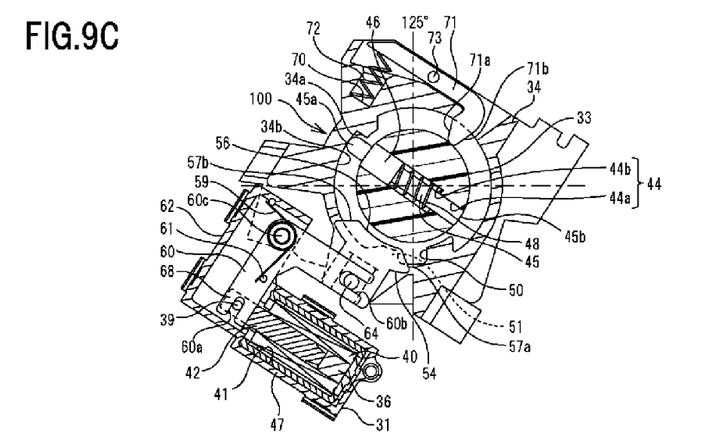
Figure 10A:
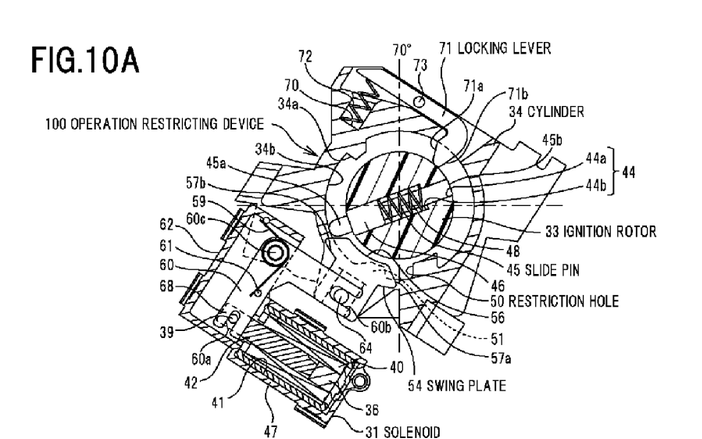
FIGS. 10A to 10C are cross sectional views showing the turning operation of the ignition rotor from the "ACC" position to the "LOCK" position in the ignition switch operation restricting device of the embodiment.

For example, as shown in FIG. 9C, when the ignition rotor 33 is turned to the "START" position via the electronic key 10, the engine 24 starts. After the engine 24 starts, the ignition rotor 33 returns to the "ON" position by the repulsive force of the return spring. Meanwhile, the solenoid 31 is kept de-energized.

Then, in order to drive the vehicle, the user (driver) moves the shift lever from the P position to the D position. As shown in FIG. 8 (Table), when the shift lever is moved from the P position to the D position with the ignition rotor 33 at the "ON" position (See FIG. 10A), the solenoid 31 is energized.

In the energized state, the swing plate 54 is restricted from moving outward (or downward) so as to inhibit the ignition rotor 33 from moving to the "LOCK" position.

Figure 10B:
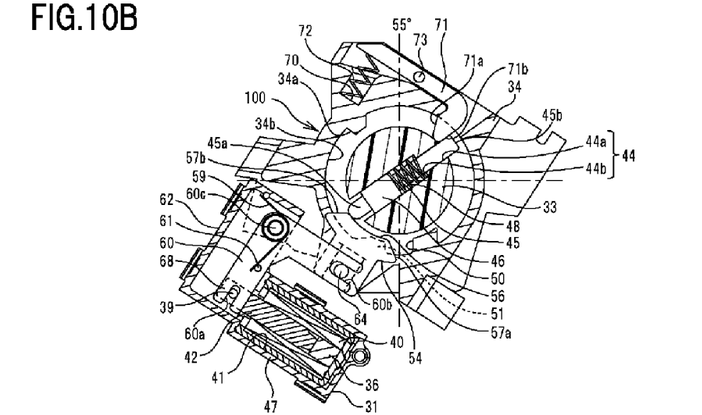
Figure 10C:
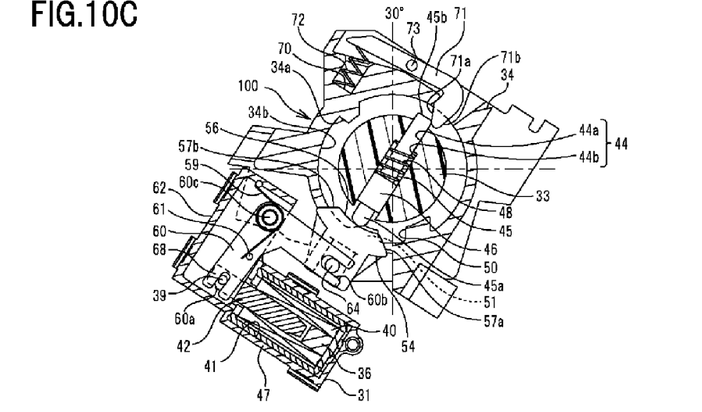

As shown in FIG. 10B, when it is tried to turn the ignition rotor 33 from the "ACC" position to the "LOCK" position, the second tip portion 45b protrudes from the periphery of the ignition rotor 33 according as the first tip portion 45a climbs up the inclined surface 57b of the swing plate 54.

In this situation, when the ignition rotor 33 is turned to the "LOCK" position, the second tip portion 45b contact the restriction surface 71b of the locking lever 71. Thus, when the shift lever is at a position other than the P position, the ignition rotor 33 can be restricted from turning to the "LOCK" position.

In order to turn the ignition rotor 33 to the "LOCK" position, the user moves the shift lever from the D position etc. to the P position. As shown in FIG. 8 (Table), when the shift lever is moved from the D position etc. to the P position, the solenoid 31 is de-energized. Thereby, the swing plate 54 is allowed to move outside of the cylinder 34.

In this situation, when the ignition rotor 33 is turned from the "ACC" position to the "LOCK" position, the first tip portion 45a pushes the swing plate 54 outward (or downward) via the inclined surface 57ab and the contact surface 56 and, simultaneously, slides on the inner periphery of the cylinder 34. Here, since the slide pin 45 does not move opposite the swing plate 54, the second tip portion 45b cannot protrude from the periphery of the ignition rotor 33. Therefore, as shown in FIG. 10C, the second tip portion 45b can cross over the locking lever 71 and turn to the "LOCK" position with the ignition rotor 33.

When the ignition rotor 33 is turned to the "LOCK" position, the first tip portion 45a moves along the inclined surface 51c and the top surface of the first restriction part 51 and is then received in the restriction hole 50. Thus, the ignition rotor 33 returns to the "LOCK" position. Then, as described earlier, when the transponder code received is authenticated, the solenoid 31 is energized.

Effects of the Embodiment

The following effects can be obtained by the above embodiment.

(1) When the solenoid 31 is not energized, the ignition rotor 33 is restricted from turning from the "LOCK" position to the "ACC" position. When the solenoid 31 is energized, the ignition rotor 33 is restricted from turning from the "ACC" position to the "LOCK" position. Thus, by switching between the energization and de-energization of the single solenoid 31, the turning operation of the ignition rotor 33 can be restricted. Therefore, as compared to the conventional ignition switch operation restricting device using plural solenoids, the device of the embodiment can be entirely downsized, simplified and reduced in power consumption.

(2) When the coil 40 of the solenoid 31 is energized, the plunger 42 is attracted to the fixed core 36 from the position where the plunger 42 contacts the fixed core 36. Therefore, as compared to the attraction type solenoid, the retention type solenoid 31 of the embodiment can be reduced in energization time and power consumption.

(3) Since the energization time to the coil 40 is reduced, heat generated by the energization can be reduced. Thus, a mechanism for suppressing the heat generation can be omitted.

Although the ignition switch operation restricting device according to the invention has been described with respect to the specific embodiments, the invention is not limited to the specific embodiments and may be carried out in other embodiments without departing from the scope of the invention. For example, the following modifications may be made.

(1) Although in the embodiment the authentication of ID is conducted by inserting the electronic key 10 into the key hole 35 and making the immobilizer communication (transponder communication), the invention is not limited to the embodiment. Alternatively, the authentication of ID may be conducted by making a radio communication using an electronic key system (i.e., smart key system) including a portable device with a transceiver equipped therein without inserting the electronic key into the key hole.

(2) Although in the embodiment the invention is applied to automobiles, the invention is not limited to the embodiment and may be applied to other vehicles.

What is claimed is:

1. An operation restricting device for an ignition switch to switch electric power supplied to a vehicle by turning an operation member, comprising:
 a body comprising a turning restriction portion at a first position and a second position arranged in a circumferential direction of the body, wherein the turning restriction portion at the second position includes a locking lever that pivots in the turning plane of a rotor;
 the rotor rotatably disposed in the body and rotated by turning the operation member in a turning region including the first position and the second position;
 a locking pin held movably in a turning plane of the rotor and extending through the rotor for restricting a first turn of the rotor from the second position to the first position by disengaging the locking lever and engaging with the turning restriction portion at the first position, and a second turn of the rotor from the first position to the second position by engaging the locking lever, the first turn and the second turn being opposite to each other; and
 a plate disposed in a movement plane of the locking pin and operably connected to an actuator for permitting movement of the locking pin and thereby permitting the first turn and the second turn of the rotor by switching the actuator.

2. The ignition switch operation restricting device according to claim 1, wherein
 the locking lever comprises an inclined surface at a side face contacting the locking pin in the first turn, and
 the inclined surface allows the first turn of the rotor when the actuator is energized.

3. The ignition switch operation restricting device according to claim 1, wherein
 the plate is maintained in a protruded state from the body to the rotor such that the locking lever allows the stopping of the locking pin in the second turn of the rotor when the actuator is energized.

4. The ignition switch operation restricting device according to claim 1, further comprising:
 a first spring for applying to the locking pin a repulsive force to push the body and the plate; and a second spring for applying to the plate a repulsive force smaller than that of the first spring in a direction opposite to the repulsive force of the first spring.

5. The ignition switch operation restricting device according to claim 4, wherein
the repulsive force of the first spring is applied such that it allows the locking pin to move in the turning plane of the rotor to release the stopping of the locking pin in the second turn when the actuator is not energized.

6. The ignition switch operation restricting device according to claim 1, wherein
the turning restriction portion at the first position comprises a restriction hole formed in the body and shaped to accommodate a tip portion of the locking pin.

7. The ignition switch operation restricting device according to claim 6, wherein
the restriction hole stops the locking pin in the first turn of the rotor when the actuator is not energized.

8. The ignition switch operation restricting device according to claim 7, wherein
the plate comprises an inclined surface for releasing the stopping of the locking pin in the first turn of the rotor when the actuator is energized.

9. The ignition switch operation restricting device according to claim 8, wherein
the plate is maintained in a protruded state from the body to the rotor such that the inclined surface allows the stopping of the locking pin to be released, in the first turn of the rotor when the actuator is energized.

10. An operation restricting device for an ignition switch to switch electric power supplied to a vehicle by turning an operation member, comprising:
a body comprising a turning restriction portion at a first position and a second position arranged in a circumferential direction of the body;
a rotor rotatably disposed in the body and rotated by turning the operation member in a turning region including the first position and the second position;
a locking pin held movably in a turning plane of the rotor by the rotor, for restricting a first turn of the rotor from the second position to the first position, and a second turn of the rotor from the first position to the second position, the first turn and the second turn being opposite to each other;
a plate disposed movably or immovably in a movement plane of the locking pin, for permitting the first turn and the second turn of the rotor by switching an actuator, and
a first spring for applying to the locking pin a repulsive force to push the body and the plate; and
a second spring for applying to the plate a repulsive force smaller than that of the first spring in a direction opposite to the repulsive force of the first spring,
wherein the turning restriction portion at the second position comprises a turning lever to turn in the turning plane of the rotor.

11. An operation restricting device for an ignition switch to switch electric power supplied to a vehicle by turning an operation member, comprising:
a body comprising a turning restriction portion at a first position and a second position arranged in a circumferential direction of the body;
a rotor rotatably disposed in the body and rotated by turning the operation member in a turning region including the first position and the second position;
a locking pin held movably in a turning plane of the rotor by the rotor, for restricting a first turn of the rotor from the second position to the first position, and a second turn of the rotor from the first position to the second position, the first turn and the second turn being opposite to each other;
a plate disposed movably or immovably in a movement plane of the locking pin, for permitting the first turn and the second turn of the rotor by switching an actuator, and
wherein the turning restriction portion at the second position comprises a turning lever to turn in the turning plane of the rotor, and
wherein the turning restriction portion at the first position comprises a restriction hole formed in the body and shaped to accommodate a tip portion of the locking pin, the restriction hole stops the locking pin in the first turn of the rotor when the actuator is not energized, and the plate comprises an inclined surface for releasing the stopping of the locking pin in the first turn of the rotor when the actuator is energized.

12. An operation restricting device for an ignition switch to switch electric power supplied to a vehicle by turning an operation member, comprising:
a body including a turning restriction portion at a first position and a second position arranged in a circumferential direction of the body, wherein the turning restriction portion at the second position has a locking lever that turns in the turning plane of a rotor;
the rotor rotatably disposed in the body and rotated by turning the operation member in a turning region including the first position and the second position;
a locking pin held movably in a turning plane of the rotor by the rotor for restricting a first turn of the rotor from the second position to the first position, and a second turn of the rotor from the first position to the second position, the first turn and the second turn being opposite to each other, and
a plate disposed in a movement plane of the locking pin and movably connected to an actuator that permits the first turn and the second turn of the rotor by the switching of the actuator, wherein the plate is maintained in a protruded state from the body to the rotor such that the locking lever engages and obstructs the locking pin in the second turn of the rotor when the actuator is energized.

* * * * *